United States Patent
Spoorenberg et al.

(10) Patent No.: US 9,022,066 B2
(45) Date of Patent: May 5, 2015

(54) EFFLUENT FLOW SPLITTER

(71) Applicants: Christ Spoorenberg, Ballontogher (IE); Raymond MacCullagh, Calry (IE)

(72) Inventors: Christ Spoorenberg, Ballontogher (IE); Raymond MacCullagh, Calry (IE)

( * ) Notice: Subject to any disclaimer, the term of this patent is extended or adjusted under 35 U.S.C. 154(b) by 158 days.

(21) Appl. No.: 13/709,008

(22) Filed: Dec. 9, 2012

(65) Prior Publication Data

US 2014/0158231 A1    Jun. 12, 2014

(51) Int. Cl.
| | | |
|---|---|---|
| F16L 41/00 | (2006.01) | |
| C02F 1/00 | (2006.01) | |
| E02B 11/00 | (2006.01) | |
| E03F 5/06 | (2006.01) | |

(52) U.S. Cl.
CPC . *E03F 5/06* (2013.01); *C02F 1/006* (2013.01); *F16L 41/00* (2013.01)

(58) Field of Classification Search
CPC ............ C02F 1/006; E03F 5/10; E03F 5/105; E03F 5/106; E03F 5/06; F16L 41/00
USPC .......... 137/561 A, 561 R; 210/170.08, 532.2; 405/40, 41, 51, 53
See application file for complete search history.

(56) References Cited

U.S. PATENT DOCUMENTS

| | | | | |
|---|---|---|---|---|
| 2,666,444 A * | 1/1954 | Graybeal | ................... | 137/561 A |
| 3,497,067 A * | 2/1970 | Tyson | ........................... | 210/259 |
| 3,848,633 A * | 11/1974 | Hurtig et al. | .............. | 137/561 A |
| 4,284,243 A * | 8/1981 | Shaner | .......................... | 239/469 |
| 4,299,553 A * | 11/1981 | Swaroop | ........................ | 425/572 |
| 4,523,606 A * | 6/1985 | Gould et al. | ............. | 137/119.07 |
| 5,010,910 A * | 4/1991 | Hickey | .............................. | 137/1 |
| 5,098,568 A * | 3/1992 | Tyson | ........................... | 210/519 |
| 5,241,867 A * | 9/1993 | Cohen et al. | ................ | 73/863.41 |
| 5,427,679 A * | 6/1995 | Daniels | ..................... | 210/170.08 |
| 6,152,650 A * | 11/2000 | Heine | ............................. | 405/36 |
| 6,503,392 B1 * | 1/2003 | Tyson | .................... | 210/170.08 |
| 6,749,745 B2 * | 6/2004 | Jowett | ........................... | 210/150 |
| 7,021,336 B2 * | 4/2006 | Burrows et al. | ................. | 138/39 |
| 7,040,840 B2 * | 5/2006 | Zook | ............................... | 405/51 |
| 7,465,390 B2 * | 12/2008 | Potts | ............................ | 210/151 |
| 7,597,112 B2 * | 10/2009 | Tsigonis | .......................... | 137/41 |
| 2008/0138156 A1* | 6/2008 | Janesky | ............................. | 405/40 |
| 2009/0178720 A1* | 7/2009 | Torres | ....................... | 137/561 A |
| 2010/0000917 A1* | 1/2010 | Zook | ............................. | 210/119 |

FOREIGN PATENT DOCUMENTS

AU    2003203870 A1 * 11/2003
WO   WO 2010003964 A1 *  1/2010

* cited by examiner

*Primary Examiner* — John K Fristoe, Jr.
*Assistant Examiner* — David Colon Morales

(57) ABSTRACT

The point of the invention is to evenly distribute water or effluent over an irrigation area or a drain field. Typically the fluid comes from a reservoir or a septic tank and is fed, by gravity, into a number of discharge pipes that would be located underground.
The device related to this invention is characterized by a container with an inlet at the top and a number of outlets at the bottom. Inside the container the fluid is directed to the center of a flow splitter surface underneath, via a specifically configured spout. To make the fluid spread radian and uniformly towards the surface's perimeter this surface has hydrophilic properties and is convex shaped. The fluid eventually flows uniformly over the surface's edge and is evenly distributed over the outlets at the bottom.

5 Claims, 3 Drawing Sheets

EFFLUENT FLOW SPLITTER

FIELD OF THE INVENTION

The present invention relates to waste water treatment systems based on irrigation of an area planted with trees, reed or a common drain field, designed for breakdown of sewage, effluent or other organic effluent. The invention also relates to systems without any specific treatment that would be commonly known as a percolation area or drain field. The invention particularly relates to the distribution point where the flow of effluent, gravity fed from the outlet pipe of a septic tank, is divided over a number of effluent pipes that are underground located in the plantation bed. Finally the invention relates to the handling and distribution of any fluid matter, including examples such as water for land irrigation purposes or sludge, whereby the use of moving parts is not preferable and whereby a small inaccuracy in distribution is allowed. The invention may be used in applications as above whereby the use of pumps is required to bring the fluid from a container or reservoir to the device related to this invention.

BACKGROUND TO THE INVENTION

Many percolation areas or drain fields contain heavily polluted areas due to poor distribution of the effluent towards the underground effluent discharge pipes at the distribution point. Often the total effluent output from the septic tank is directed into one pipe only. As a result of this, only a as small area of the drain field will receive nearly all off the effluent which will result in an local overload of the system. In these cases, other adjacent areas that are linked to the system obviously do not receive effluent of any significance and therefore do not contribute effectively to the drain field system. This malfunctioning results in an overall inefficiency, pollution related complaints and problems with acceptance of these drain field systems in general.

Looking closer to a common distribution box, often a simple concrete or plastic casing with a number of holes near the bottom, it is obvious to notice that some of the connected outlets are not positioned on an equal level in the box to provide an even distribution. An equal level can be achieved in theory only as these solutions deal with manufacturing and installation inaccuracies and, after some time, movement of the soil causing a distribution box to tilt to a slight angle. Furthermore the slightest sewage residue build-up will cause obstruction for effluent to enter any particular pipe thereby making an even distribution even more unlikely.

Although the problem may seem to apply predominantly for small trickling or dripping flows it certainly applies to higher flow rates too. The scattering or splashing of effluent, which may come with a high flow rate when it hits the bottom of a common distribution box, may be believed to be uniform but will have a preferred direction as determined by the position and shape of the septic overflow or a baffle plate, if present.

The problems as described above can be overcome principally by inserting the device related to this invention, an effluent flow splitter, which offers a secure solution for an even distribution of the effluent over its connected pipes even when positioned under a slight angle, due to inaccurate installation, over time movement of soil or other factors.

STATEMENT OF INVENTION

The device related to this invention comprises a container with an inlet at the top and a multitude of outlets at the bottom. The flow through the device is driven by gravity. The device typically carries inside this container: a funnel in the upper section with a spout at its outlet, a flow splitter surface positioned directly underneath and a number of outlets at the bottom of the container.

The funnel has means to baffle the incoming flow and, provided with a narrow spout to secure a straight flow or dripping of effluent, avoids an uncontrolled scatter, to the centre of the flow splitter surface.

This flow splitter surface is designed to a particular and rotational symmetric shape to prevent the effluent flowing unevenly into one or more random directions. More specifically, this surface is predominantly convex shaped and, from its center, it is provided with a rotational symmetric area of protruding shapes onto which the droplets of effluent will be directed.

When these droplets reach the centre of the flow splitter surface, a film or bed of effluent will be formed initially in the centre area as a result of a balance between surface tension, cohesive and adhesive forces and size and shape of the centre area. At the point of saturation of said area the surface tension along the perimeter of this area has increased to its maximum but will be uniform. At this point the film has already spread but will eventually break along this area's perimeter, resulting into a flow of droplets which will descend following the convex surface that provides a radial uniform and descending slope. The slope also forces clusters of droplets to separate on their continuing descent, by the effect of the mentioned gravitational force, as all droplets will find their own radian path the steepest and therefore preferable. With a continues curved convex shape of the flow splitter surface the expanding film or bed will automatically find that break point at some stage and is therefore considered a preferable shape above a cone, let alone a flat plate. The flow splitter surface however, may have areas that are conical shaped or even cylindrical.

It is highly beneficial to have the flow splitter surface made of a material with absorbing or hydrophilic qualities. This will provide uniform adhesive forces after having broken the fluid's surface tension and prevent a descending droplets to drag effortlessly other droplets along into an ongoing stream into one direction only. The adhesive forces that come with the absorbing or hydrophilic qualities even cause a slight distribution in upward direction. In general terms these material properties will add robustness to the principle and allow the systems to perform adequately even under a noticeable angle. The use of such material however is not intended to filter or treat the effluent but only applied to improve the uniform distribution of the flow.

A number of radian positioned vertical ribs may be fitted to this surface to further prevent droplets of effluent moving to adjacent partitions on their descent towards the outer perimeter of this surface and therefore provide additional guidance towards designated outlets.

The surface's outer perimeter has a dripping edge with a specific shape to prevent the descending effluent to run along the perimeter towards an adjacent outlet. Despite many embodiments thinkable, the dripping edge will preferably be shaped as a toothed or notched vertical rim, downwards oriented.

Finally the effluent will drop into the outlet pipes that are positioned underneath the dripping edge. For a better accuracy and particular if the outlet pipes run i.e. horizontally, there is a need to separate the outlet pipes by vertical partitions, thus forming a set of collection chambers or likewise, to prevent the effluent to run across the bottom surface into the wrong outlet pipe, thereby ensuring even flows of the effluent to the outlet discharge pipes.

The distribution of effluent over the collection chambers or outlet pipes is within an acceptable accuracy and without use of moving parts or power supply. Particular the lack of moving parts is a necessity as sewage treatment systems are generally not easy accessible for maintenance and repairs. They is are also highly subject to an un-clean and harmful environment whereby the use of moving parts would imply the need for regular maintenance, excessive costs and high risks of breakdown.

Ultimately the device secures an evenly distributed flow towards each underground effluent discharge pipe under varying conditions and therefore forms a foundation for a proper functioning percolation area or drain field and thus for improved waste water treatment.

The system typically applies to distribution of effluent into a percolation area or drain field but also suits other application such as distribution of water for land irrigation purposes.

DETAILED DESCRIPTION

Figure 1:
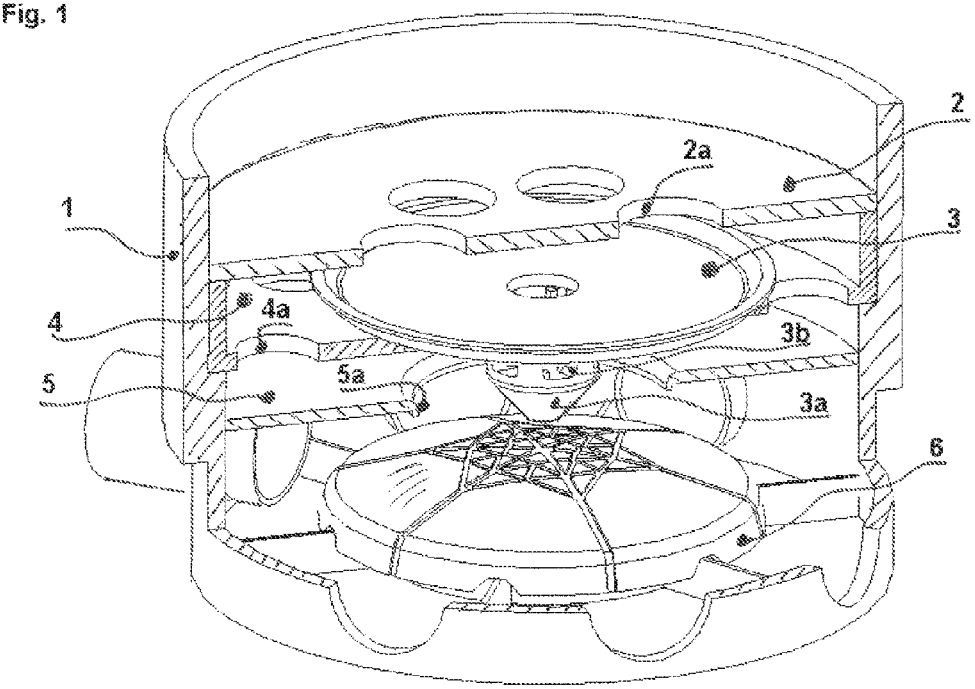
FIG. 1: 3-dimensional front view with funnel, flow splitter surface, cross sections of container, inlet plate, support plate and guide ring.
Figure 2:
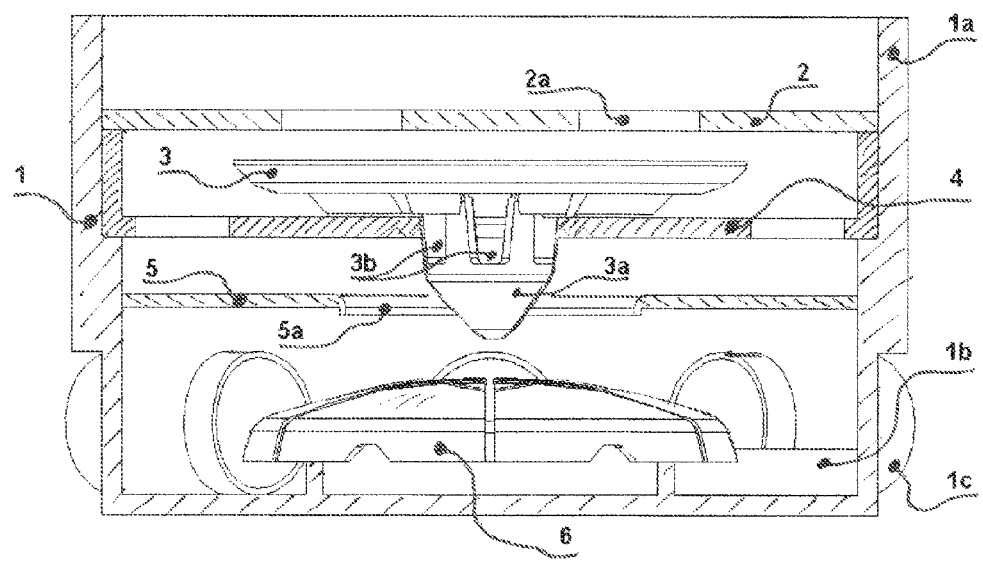
FIG. 2: 2 dimensional cross section front view
Figure 3:
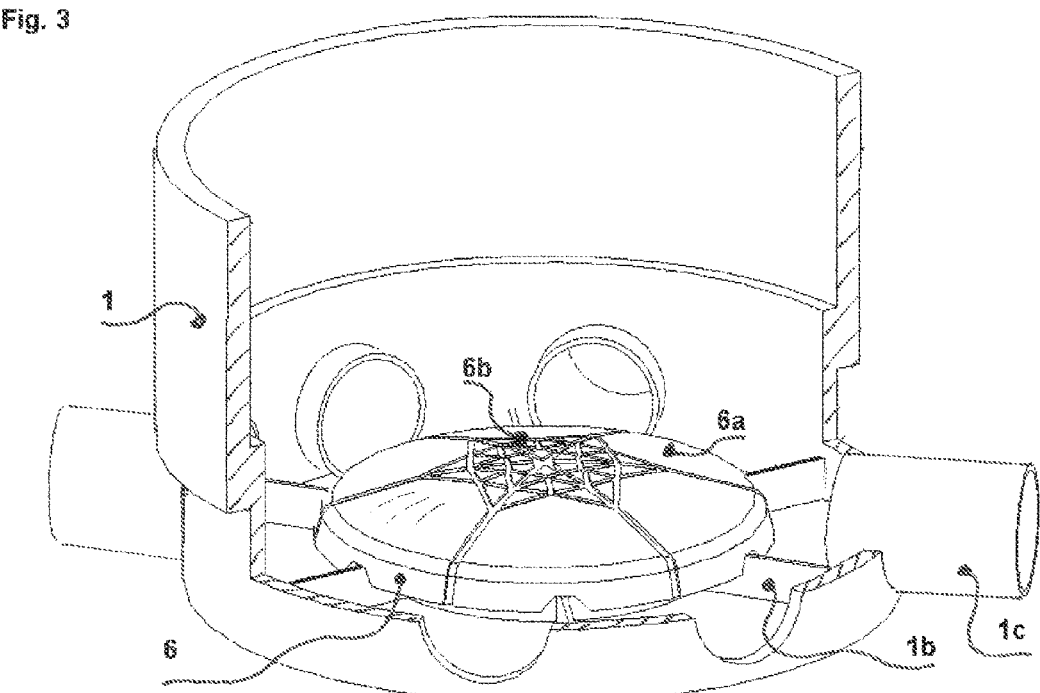
FIG. 3: 3-dimensional front view with flow splitter surface and cross section of container.
Figure 4:
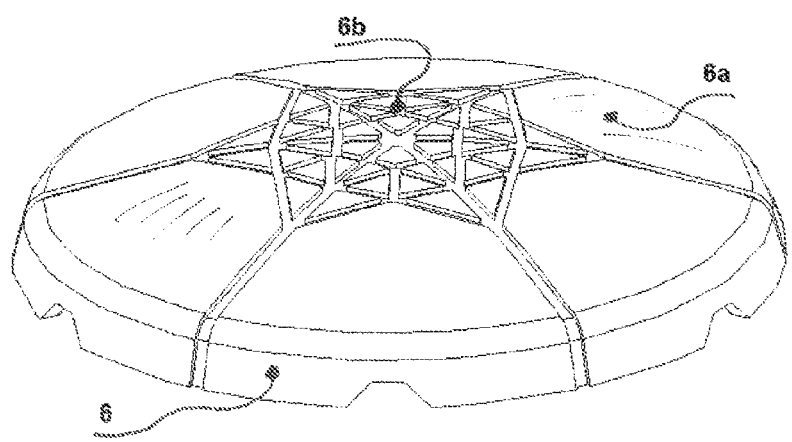
FIG. 4: 3-dimensional view of flow splitter surface
Figure 5:
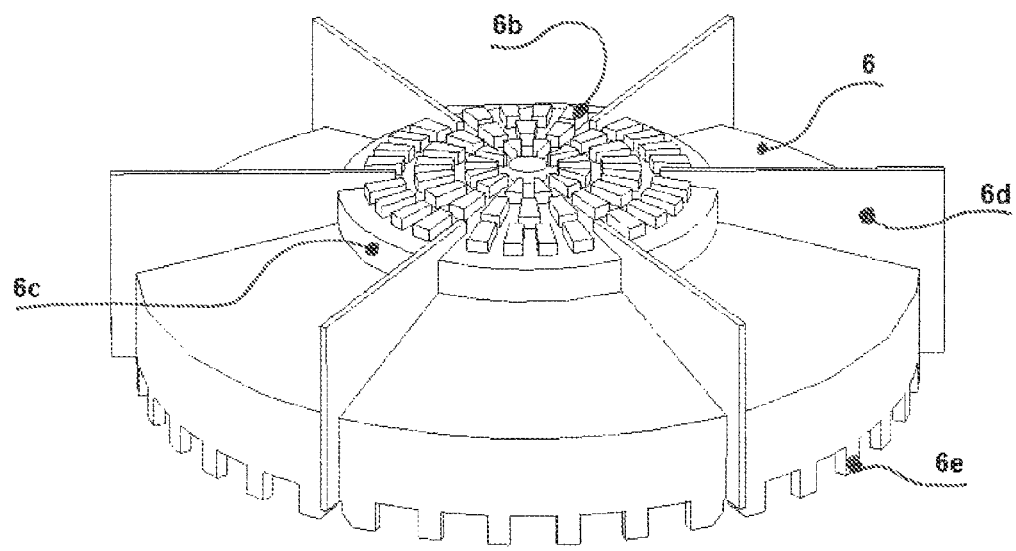
FIG. 5: 3-dimensional view of flow splitter surface, alternative
Figure 6:
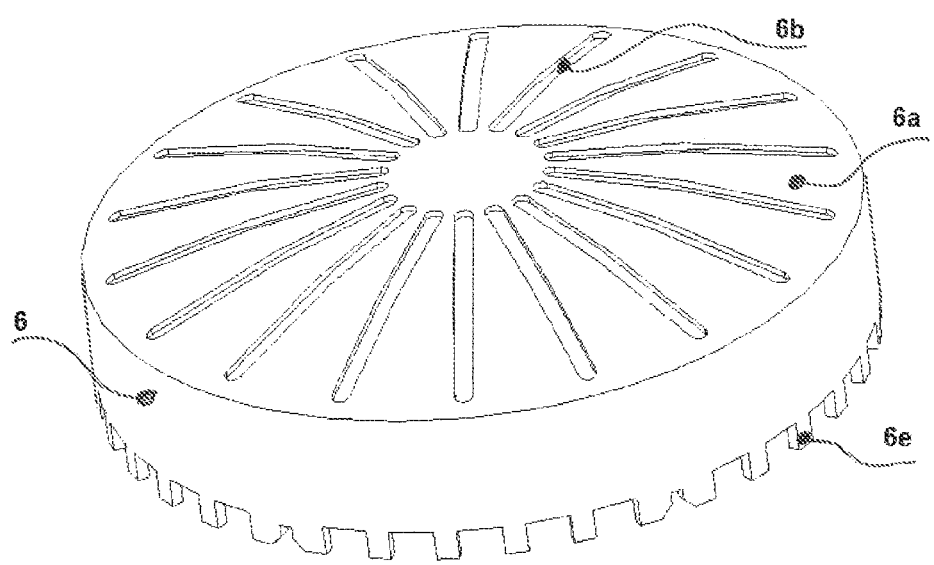
FIG. 6: 3-dimensional view of flow splitter surface, alternative

The device consists of a vertically oriented container (1) that generally will be cylindrically shaped. Inside are located: an inlet plate (2), a funnel (3) which is positioned in a support plate (4), a guide ring (5) and a flow splitter surface (6).

The container is open at the top and may have an edge (1a) around its outer perimeter that is extended upwards with the function to catch and collect uncontrolled flows of effluent, coming from a septic tank outlet pipe for example, thus preventing effluent to be spilled over the device. The container has in its bottom section a multitude of upstanding ribs (1b) incorporated to divide the bottom's surface into a number of separated chambers. Each chamber has its outlet (1c) through the bottom plate or through the wall of the bottom section, which is provided with means for connectivity with its designated effluent pipe. The upstanding ribs are obsolete if the outlets are in the bottom plate and their function is incorporated in the shape of these outlets.

The inlet plate provides inlet to the system via one or more holes (2a) that are located above the funnel inside. None of said holes is aligned vertically with the funnel's outlet underneath, thereby providing also a baffling function. The holes have a small dripping edge at the bottom along their perimeter.

The funnel has basically the shape of a bowl or saucer with a hole in its centre underneath which the spout (3a) is placed. As the spout has to be narrow at its end, i.e. forming a tip, to keep the flow concentrated towards the centre of the system, it is constructed in a way that the effluent can run over its surface instead of through a narrow gap in the centre, to prevent clogging up. This is done by placing large holes (3b) at the base of, or at least above the tip of, the spout through which the effluent will flow from the inside towards the outside of the spout. From there it will continue flowing downwards, over the spout's surface towards the tip at its end.

The support plate carries the funnel and secures its centred position. It has also a number of holes (4a) that function as a bypass for the funnel in case of inundation during which the funnel will over flow. In this case the excessive fluid will pass through these holes and eventually be directed to the centre of the device, again via a hole (5a) in the centre of the guide ring and eventually in the centre area of the flow splitter surface underneath. Mentioned holes have a small dripping edge along their perimeter.

The flow splitter surface's basic shape is typically circular. It is convex or conical shaped (6a) or a combination there of, in a descending orientation. Particularly from its center the flow splitter surface may contain a number of protruded shapes (6b) such as ribs, domes, dimples or grooves. An alternative embodiment of the flow splitter surface has an additional vertical descending step (6c) towards the remaining surface area. The flow splitter surface may be made of any material but a material with hydrophilic, i.e. absorbing or porous, properties is preferable, particularly for said centre area. Another alternative embodiment has a multitude of perpendicular ribs (6d) that are be radial positioned, starting in the area with the protruding elements and eventually extending over a length that reaches slightly beyond the outer perimeter of the flow splitter surface. The outer perimeter of the flow splitter surface is extended downwards and contains a multitude of notches (6e) at least equal to the number of outlets. The number of notches can be extended and ultimately create a strong resemblance with a row of shark teeth or a comb.

The invention claimed is:

1. A device for dividing a flow of fluid, such as effluent or water for irrigation, by gravity comprising:
   a container provided with a plurality of outlet openings, or collection chambers, located in the bottom part of the container and an inlet opening located in the top part of the container, inside which the descending fluid is directed from the inlet opening into;
   a hollow, vertically arranged and conical shaped spout, with the spout's tip pointing towards the bottom part of the device, said spout is provided with, one or more, holes located above said tip to direct the fluid from the internal area of the spout to the external surface of said spout, allowing the fluid to continue to descend, via the tip of the spout, to the centre of;
   a flow splitter surface, whereby said surface is shaped in a convex manner causing the fluid to spread radially and uniformly towards, and eventually running past, the surface's outer edge, thereby fluid evenly among said outlet openings or collection chambers located underneath said outer edge.

2. A device according to claim 1 in which said convex shaped flow splitter surface is, from its centre, provided with a rotational symmetric pattern of protruding elements, dimples, ribs or grooves.

3. A device according to claim 1 in which said convex shaped flow splitter surface contains material properties, such as absorbing or hydrophilic, that provide adhesion with the fluid, such as through breaking the surface tension of the fluid, and cause the fluid to spread uniformly over said surface.

4. A device according to claim 2 in which said convex shaped flow splitter surface contains material properties, such as absorbing or hydrophilic, that provide adhesion with the fluid, such as through breaking the surface tension of the fluid, and cause the fluid to spread uniformly over said surface.

5. A device as claimed in any preceding claim whereby the outer perimeter of said flow splitter surface forms a dripping edge that is provided with a multitude of vertically arranged notches to prevent the fluid, that has reached said outer perimeter, to run tangentially alongside said outer perimeter towards an adjacent, and therefore not designated, outlet opening or collection chamber.

* * * * *